Patented Mar. 20, 1923.

1,449,106

UNITED STATES PATENT OFFICE.

FRIEDRICH HAYDUCK, OF WILMERSDORF, GERMANY, ASSIGNOR TO THE FLEISCHMAN COMPANY, OF NEW YORK, N. Y., A CORPORATION OF OHIO.

LOW-ALCOHOL YEAST PROCESS.

No Drawing.      Application filed October 30, 1920. Serial No. 420,833.

(GRANTED UNDER THE PROVISIONS OF THE ACT OF MARCH 3, 1921, 41 STAT. L., 1313.)

*To all whom it may concern:*

Be it known that I, FRIEDRICH HAYDUCK, citizen of Germany, residing at Wilmersdorf, Germany, have invented certain new and useful Improvements in Low-Alcohol Yeast Processes (for which application for patent was filed in Germany March 19, 1915, Patent No. 303,222), of which the following is a specification.

This invention relates to a process for the manufacture of yeast and particularly to a process for manufacturing a compressed bakers' yeast in which very little alcohol is produced as a by-product and has for its object an improved procedure for manufacturing yeast in a more convenient and economical manner than heretofore.

In accordance with the process protected by my German Patent 300,662 and set forth in my corresponding copending application for United States Patent Serial No. 420,832, filed Oct. 30, 1920, a high yeast yield is obtained at the expense of the production of alcohol, in worts of normal concentration, by starting the growth of the yeast in a very weak solution and thereafter adding concentrated wort slowly and substantially continuously, whereby, as a result of the constant consumption of the nutrients and the resultant alcohol on the part of the yeast, in spite of the addition of concentrated wort, there is always a sufficiently low concentration of nutrients and yeast conversion products. For the carrying out of this process the use of yeast wort of normal quality is contemplated.

In the process described hereinafter, which constitutes the subject-matter of my present invention, this peculiar distribution of the nutrient liquid is applied to worts, which are prepared principally from sugar or sugar-containing substances (for example, molasses), and inorganic salts. In the production of yeast from such sacchariferous solutions, containing mineral salts as yeast nutrients, the difficulty has hitherto always been encountered that the yeast cannot stand such high salt concentrations as are required for its full nourishment in yeast nutrient solutions of heretofore usual sugar content, and that it was therefore necessary, to work either with greatly diluted nutrient liquids or solutions or with solutions containing a disproportionately small quantity of inorganic yeast-nutrient salts. The latter procedure, however, results in correspondingly small yeast yields because of the deficiency of yeast essential substances or elements for which the yeast was dependent upon the inorganic salts.

By applying the hereinafter described process of "adding," the results are attained that owing to the appropriate gradual addition of nutrients at the desired rate, there is not only avoided an accumulation of alcohol, but also deleterious accumulation of nutrient salts is avoided, as the salts, as well as substantially all resulting alcohol which may be formed, are immediately assimilated by the yeast. The manipulative operation of the process is the same as described in German Patent 300,662 and in the aforesaid corresponding copending application for United States Patent Serial No. 420,832.

For the preparation of the nutrient solutions, there are used, for instance, sugar and yeast-nutrient inorganic salts (ammonium, potassium and magnesium combined with phosphoric acid, sulphuric acid, etc.). This process permits of the use of the salts in a proportion up to half as much total salts as sugar. When using ammonium sulphate as a nitrogen source, the rapid assimilation of the nutrient salts supplied for the yeast can be recognized by the surprisingly great increase in acid content (sulphuric acid ions set free) in the nourishing liquid. The deleterious excess of this liberated acid can be eliminated by the addition of alkalies or salts having an alkaline reaction in accordance, for example, with the process of my copending application for United States Patent Serial No. 420,830.

The process, for example, may be suitably carried out in the following manner:

To 100 parts of sugar there are used: 40 parts of ammonium sulphate, 9 parts acid phosphate of potassium, 1 part magnesium sulphate, to which is to be added about 30 parts calcium carbonate for the neutralization.

To 100 parts molasses (with 50 per cent sugar content), there are used: 10 parts ammonium sulphate, 10 parts superphosphate (having 18% water soluble phosphoric acid), 0.5 parts magnesium sulphate, to which is to be added about 4 parts calcium carbonate.

The raw nutrient materials are dissolved in sufficient water so that the sugar content of the solution amounts to about 10 percent. As soon as the yeast is brought into the fermenting vat with a part of the nutrient solution, wnich has been previously diluted as will be hereinafter described aeration and the addition of the remaining nutrient solution is started. Carrying out the process of the present invention in a manner similar to that described in my copending application for United States Patent Serial No. 420,832, the seed yeast may be added in the first instance to a solution of a strength of about 1° Balling and containing also a proportionate amount of nutrient salts which are used, and thereafter during the growth of the yeast the solution containing about 10% of sugar and a proportionate quantity of the nutrient salts, may be added slowly and substantially continuously so as to maintain the concentration of about the solution in which the yeast is propagating approximately constant or at a slightly greater or less concentration during the main portion of the period of propagation. The calcium carbonate or chalk is either all added at the beginning or, in accordance with the increase in acidity, gradually, to the fermenting vat. One can also distribute the yeast in the beginning in water in the fermenting vat, and then gradually and substantially continuously add the nutrient solution as described. It will be seen that the liquid in which the yeast is suspended should be non-toxic to the yeast. After all the nutrient solution has been added, the aeration is continued and the propagation is concluded in the well known manner, the yeast being thereafter separated from the finally attenuated nutrient solution wherein it has been grown.

Although my process is not limited to any particular duration of the period of yeast propagation, which may vary within considerable limits and may comprise such periods as are deemed proper or found most desirable in accord with the facilities and results desired in a particular yeast manufacturing establishment, it has been found, as stated in my German Patent No. 300,662, that if an aeration period totalling about 10 hours is employed, the gradual addition of the nutrient solution to the aerated solution as described may cover a period of 7 to 8 hours followed by a period of 2 to 3 hours aeration after this gradual addition is completed. The rate of addition and the duration of the process may be determined in accordance with tests so that the concentration remains approximately constant and at such a degree of dilution that accumulation of alcohol in the solution is substantially prevented, owing to the fact that in such dilute solution any alcohol which may be formed is again assimilated by the yeast, and an especially efficient utilization of the nutrient substances for obtaining a high yield of yeast in the process is thus attained.

Having described my invention what I claim as new and desire to secure by Letters Patent, is:

1. A process of propagating yeast which comprises preparing a nutrient solution comprising essentially sugar material and yeast nourishing inorganic salts, suspending seed yeast in a non-toxic aqueous liquid, aerating the liquid, and substantially continuously adding the nutrient solution.

2. A process of propagating yeast with a relatively low yield of alcohol which comprises preparing a nutrient solution, exclusive of cereal material, comprising essentially sugar material and yeast nourishing inorganic salts, suspending seed yeast in a non-toxic aqueous liquid, aerating the liquid, and substantially continuously adding the nutrient solution.

3. A process of preparing yeast with a relatively low yield of alcohol which comprises suspending seed yeast in a non-toxic aqueous liquid, aerating the liquid, and substantially continuously adding thereto sugar material and yeast nourishing inorganic salts at a rate such that the concentration of the aerated liquid does not arise above that at which substantially all of the alcohol which may be formed is assimilated by the yeast.

4. A process of propagating yeast with a relatively low yield of alcohol which comprises suspending seed yeast in a non-toxic aqueous liquid, aerating said liquid, substantially continuously adding thereto sugar material and yeast nourishing inorganic salts from which components are liberated which tend increasingly to acidify the solution during propagation, which addition is at a rate such that the concentration of the aerated liquid does not arise above that at which substantially all of the alcohol which may be formed is assimilated by the yeast, and during the period of propagation neutralizing the deleterious excess of such acidity.

5. A process of propagating yeast with a relatively low yield of alcohol which comprises suspending seed yeast in a non-toxic aqueous liquid, aerating said liquid, substantially continuously adding thereto sugar material and yeast nourishing inorganic salts from which components are liberated which tend increasingly to acidify the solution during propagation, which addition is at a rate such that the concentration of the aerated liquid does not rise above that at which substantially all of the alcohol which may be formed is assimilated by the yeast, and during the period of propagation neutralizing the deleterious excess of such acidity, by the fractional addition of an innocuous antacid substance.

6. A process of propagating yeast with a relatively low yield of alcohol which comprises preparing a nutrient solution comprising essentially sugar material and yeast nourishing inorganic salts from which components are liberated which tend increasingly to acidify the solution during propagation, suspending seed yeast in a non-toxic aqueous liquid, aerating the liquid, substantially continuously adding the nutrient solution to the aerated liquid, and adding during the period of propagation an innocuous antacid substance adapted to neutralize at least a substantial portion of such acidity.

7. A continuous process of propagating yeast with a relatively low yield of alcohol which comprises preparing a nutrient solution, exclusive of cereal material, comprising essentially sugar material and yeast nourishing inorganic salts from which components are liberated which tend increasingly to acidify the solution during propagation, suspending seed yeast in a non-toxic aqueous liquid, aerating the liquid, thereafter substantially continuously adding the nutrient solution to the aerated liquid, and during the period of propagation neutralizing the deleterious excess of such acidity.

8. A process of propagating yeast with a relatively low yield of alcohol which comprises preparing a nutrient solution comprising essentially sugar material and yeast nourishing inorganic salts from which components are liberated which tend increasingly to acidify the solution during propagation, suspending seed yeast in a non-toxic aqueous liquid, aerating the liquid, substantially continuously adding the nutrient solution to the aerated liquid, and during the period of propagation neutralizing at least a substantial portion of such acidity, by the fractional addition of an innocuous antacid substance.

9. A process of propagating yeast with a relatively low yield of alcohol which comprises initiating propagation of yeast in a highly dilute nutrient solution consisting essentially of water, sugar material, and yeast nourishing inorganic salts, aerating the solution, and gradually and substantially continuously adding thereto a more concentrated aqueous solution of sugar material and yeast nourishing inorganic salts, the total amount of yeast nourishing inorganic salts used in the process amounting to about one-half of the total amount of sugar used.

10. A process of propagating yeast with a relatively low yield of alcohol which comprises preparing a nutrient solution containing essentially sugar material and yeast nourishing inorganic salts, the total amount of yeast nourishing inorganic salts used being about one-half of the total amount of sugar used, highly diluting a portion of the nutrient solution, initiating propagation of yeast therein with aeration, and during the period of propagation slowly and substantially continuously adding the concentrated solution.

11. A process of propagating yeast with a relatively low yield of alcohol which comprises preparing a nutrient solution containing essentially sugar material and yeast nourishing inorganic salts from which components are liberated which tend increasingly to acidify the nutrient solution during propagation, the total amount of yeast nourishing inorganic salts used being about one-half of the total amount of sugar used, highly diluting a portion of the nutrient solution, initiating propagation of yeast therein with aeration, during the period of propagation slowly and substantially continuously adding the concentrated solution, and neutralizing a substantial portion of such acidity by the addition of an innocuous antacid substance.

12. A process of propagating yeast with a relatively low yield of alcohol which comprises initiating propagation of yeast in a dilute nutrient solution comprising essentially sugar material and yeast nourishing inorganic salts, aerating the solution, and adding thereto substantially continuously during the period of propagation a solution containing sugar material and yeast nourishing inorganic salts at a rate such that the concentration of the solution in which the yeast is propagating is maintained substantially constant.

13. A process of propagating yeast with a relatively low yield of alcohol which comprises initiating propagation of yeast in a dilute nutrient solution comprising essentially sugar material and yeast nourishing inorganic salts, from which components are liberated which tend increasingly to acidify the nutrient solution during propagation, aerating the solution, during the period of propagation adding thereto substantially continuously sugar material and yeast nourishing inorganic salts, at a rate such that the concentration of the solution in which the yeast is propagating is maintained substantially constant, and during the period of propagation neutralizing a substantial portion of such acidity by the addition of an innocuous antacid substance.

14. The process of propagating yeast which comprises initiating the yeast growth in a dilute aqueous solution comprising essentially sugar material and yeast nourishing inorganic salts, aerating the solution, and adding thereto gradually and continuously, and at least during the major portion of the period of yeast propagation therein, a yeast nutrient solution containing essentially sugar material and yeast nourishing inorganic salts, the salt content of the solutions being approximately one-half the sugar content.

15. A process of propagating yeast which comprises initiating the propagation of yeast in a highly dilute nutrient solution comprising essentially water, molasses and yeast nourishing inorganic salts from which, during propagation, components are liberated which tend increasingly to acidify the nutrient solution, aerating the solution, and during the period of propagation adding to the solution a more concentrated aqueous solution of molasses and yeast nourishing inorganic salts, and sufficient quantities of an innocuous antacid substance to neutralize at least a substantial portion of such acidity.

16. A process of propagating yeast which comprises initiating the propagation of yeast in a dilute aqueous yeast nutrient solution containing sugar material and yeast nourishing inorganic salts from which, during propagation, components are liberated which tend increasingly to acidify the nutrient solution, aerating the solution, adding to the nutrient solution containing the yeast, during at least a portion of the period of propagation, additional sugar and material and yeast nourishing inorganic salts, the proportion of total inorganic salts employed during the entire period of propagation being approximately one-half the total quantity of sugar employed, and during the period of propagation, neutralizing at least a portion of such acidity.

In testimony whereof, I have affixed my signature.

FRIEDRICH HAYDUCK.

Certificate of Correction.

It is hereby certified that in Letters Patent No. 1,449,106, granted March 20, 1923, upon the application of Friedrich Hayduck, of Wilmersdorf, Germany, for an improvement in "Low-Alcohol Yeast Processes," errors appear in the printed specification requiring correction as follows: Page 2, line 12, after the word "solution" strike out the comma and insert the same to follow the word "described" in line 13; same page, line 29, strike out the word "about"; and that the said Letters Patent should be read with these corrections therein that the same may conform to the record of the case in the Patent Office.

Signed and sealed this 29th day of May, A. D., 1923.

[SEAL.]

KARL FENNING,
*Acting Commissioner of Patents.*